(12) United States Patent
Rodgers et al.

(10) Patent No.: US 7,938,965 B2
(45) Date of Patent: May 10, 2011

(54) BIOFILM REACTOR

(75) Inventors: Michael Rodgers, Galway (IE); John Mulqueen, Ballinrobe (IE); Rose Mulqueen, legal representative, Ballinrobe (IE); Aoife Lambe, Tullamore (IE); Liwen Xiao, Galway (IE); Eoghan Clifford, County Limerick (IE); John Prendergast, Claremorris (IE)

(73) Assignee: National University of Ireland, Galway (IE)

( * ) Notice: Subject to any disclaimer, the term of this patent is extended or adjusted under 35 U.S.C. 154(b) by 396 days.

(21) Appl. No.: 11/631,897

(22) PCT Filed: Jul. 7, 2005

(86) PCT No.: PCT/EP2005/007453
§ 371 (c)(1),
(2), (4) Date: Jan. 7, 2009

(87) PCT Pub. No.: WO2006/003026
PCT Pub. Date: Jan. 12, 2006

(65) Prior Publication Data
US 2009/0152195 A1 Jun. 18, 2009

(30) Foreign Application Priority Data
Jul. 7, 2004 (IE) .................................. S2004/0461

(51) Int. Cl.
*C02F 3/04* (2006.01)
*C02F 3/10* (2006.01)
(52) U.S. Cl. .................... 210/615; 210/150; 210/255

(58) Field of Classification Search .................. 210/615, 210/150, 151, 255, 261, 262
See application file for complete search history.

(56) References Cited

U.S. PATENT DOCUMENTS

| | | | | |
|---|---|---|---|---|
| 2,014,431 | A * | 9/1935 | Foster | 210/150 |
| 2,865,617 | A * | 12/1958 | Dickens et al. | 210/150 |
| 3,618,778 | A * | 11/1971 | Benton et al. | 210/150 |
| 4,093,546 | A * | 6/1978 | Taborsky | 210/150 |
| 4,303,528 | A * | 12/1981 | Shibayama | 210/615 |
| 4,675,103 | A * | 6/1987 | Nadudvari et al. | 210/150 |
| 5,089,137 | A * | 2/1992 | McKown | 210/615 |
| 5,211,844 | A * | 5/1993 | Hattori et al. | 210/151 |
| 5,223,129 | A * | 6/1993 | Hsieh | 210/150 |
| 5,560,819 | A * | 10/1996 | Taguchi | 210/150 |
| 6,024,870 | A * | 2/2000 | Thompson | 210/151 |
| 6,409,914 | B1 * | 6/2002 | Keppeler et al. | 210/151 |
| 7,300,570 | B2 * | 11/2007 | Yang et al. | 210/151 |
| 2003/0116488 | A1 * | 6/2003 | Cameron | 210/150 |
| 2004/0074839 | A1 * | 4/2004 | Paloheimo | 210/615 |

* cited by examiner

*Primary Examiner* — Christopher Upton
(74) *Attorney, Agent, or Firm* — Van Dyke, Gardner, Linn & Burkhart, LLP

(57) ABSTRACT

The present invention provides a reactor for the biological processing of fluid such as domestic or industrial waste water or the like, the reactor comprising a plurality of substantially horizontal layers of growth medium stacked one above the other, and having a colonizing biofilm thereon during use, the reactor being arranged to cause the path of flow of the fluid to reverse from one layer to the next, in order to maximize the length of the path of flow for a given footprint of the reactor.

15 Claims, 3 Drawing Sheets

BIOFILM REACTOR

The present invention is concerned with a biofilm reactor, and in particular a biofilm reactor for the treatment of waste water, specifically the removal of biodegradable organic carbon and the reduction of nitrogen concentration.

Waste water or sewage is essentially polluted water released from residences, businesses, and municipal/industrial/agricultural sources, and must be suitably treated, by reducing or removing organic matter, disease causing organisms, and other pollutants therefrom, before being released back into the environment, or being re-used. Two of the main wastewater borne sources of pollution that result in environmental damage are organic carbon and nitrogen. Some of the environmental issues associated with elevated levels of carbon and nitrogen are increased levels of organic nutrients and minerals in bodies of water, resulting in the excess growth of plant life, in particular algae. This will normally result in a reduction of the dissolved oxygen content of the water, and can therefore cause the extinction of other organisms residing in such bodies of water. A further issue arising from untreated wastewater is unsafe levels of nitrate in drinking water, in addition to odour problems.

The most effective and economic method for the treatment of wastewater is the biological processing thereof using some form of biomass, thereby achieving aerobic processing, anoxic processing, anaerobic processing, or a combination thereof. The biomass is generally contained within some form of reactor, or as a biofilm on a suitable substratum, with which the wastewater is brought into contact. The biological processes result in the removal of organic carbon from the wastewater, the carbon being consumed by the biomass, and the nitrification and denitrification of any nitrogen in the wastewater. Nitrification is the biological process of converting ammonium firstly to nitrite, and subsequently to nitrate. This process is achieved in two stages, the first being the conversion of ammonium into nitrite by micro-organisms known as nitrosomonas, and a second stage in which the nitrite is converted into nitrate, by micro-organisms known as nitrobacter. The nitrate must then be converted, by the biological process of denitrification, into nitrogen and other gaseous end products. Denitrification occurs in an anoxic environment in the presence of nitrates and an organic carbon source.

A large number of biomass based systems or reactors exist for the treatment of wastewater, whether on a large or small scale, for example biological aerated filters (BAF), moving media biofilm reactor systems (MMBR), sand filters and peat filter systems. BAF systems normally consist of plastic media immersed in the wastewater to be treated. Biofilms develop on these media and receive their oxygen from compressed air that is diffused into the treatment reactor. These biofilms use the substrates in the wastewater and the diffused oxygen to generate new cells which, when they become separated from the plastic media, can be settled out in a clarifier and the treated water can be discharged to a watercourse. BAF systems can become clogged and may need a mechanism for dislodging the clogged material from the plastic media. In addition, the compressed air may not supply adequate oxygen throughout the system, and the compressor itself will require maintenance.

MMBR systems consist of small plastic elements that are suspended in the reactor using the motion of the wastewater caused by a compressor or mixer. Biofilms develop on these elements. However, the elements can be completely bridged with biofilm growth and must be retained in the reactors. This retention can cause problems and a compressor is required.

Sand filters consist of a layer of graded sand, approximately 0.6 to 0.9 metres deep, with particles within a particular size range through which the wastewater is percolated. Biofilm builds on the sand particles and carries out the necessary treatment. A plan area of about 4 $m^2$ per person is required to avoid clogging, which is a common occurrence and may occur due to variable loading. Clogging requires significant maintenance of the system. In addition, suitable sand may not be available locally. A peat filter system consists of a layer of peat fibre, approximately 0.6 metres deep, through which the wastewater is percolated. Again clogging is common and can occur due to variable loading, thereby requiring significant maintenance.

It is therefore an object of the present invention to provide an improved biofilm reactor for the treatment of wastewater.

It is a further object of the present invention to provide a biofilm reactor having a small footprint.

According to a first aspect of the present invention there is provided a biofilm reactor comprising a plurality of, in use, substantially horizontal layers of growth medium arranged in a stacked array, each layer having a fluid entrance end and a fluid exit end, the exit end of each layer being in fluid communication with the entrance end of the layer therebeneath.

Preferably, the plurality of layers of growth medium define a boustrophedonic flowpath through the reactor.

Preferably, each layer of growth medium is provided with a plurality of protrusions in order to increase the surface area available for biofilm colonisation.

Preferably, the protrusions are formed as depressions in each layer.

Preferably, the protrusions are conical or frusto-conical in shape.

Preferably, each layer is provided with an upstanding wall about a perimeter of the layer, other than along the exit end thereof.

Preferably, the growth medium is divided into a first set of layers and a second set of layers, the spacing between adjacent layers in the first set being sufficient to prevent clogging by heterotrophic growth, while the spacing between adjacent layers in the second set is sufficient to prevent clogging by autothropic growth.

Preferably, adjacent layers in the first set are separated by a distance of more than 20 mm, most preferably more than 25 mm.

Preferably, adjacent layers in the second set are separated by a distance of more than 5 mm, most preferably of more than 10 mm.

Preferably, the layers are stacked one on top of the other, the protrusions being dimensioned to suitably space adjacent layers from one another.

Preferably, the first set of layers are housed within a first tank, and the second set of layers are housed within a second tank, the first and second tanks being in fluid communication with one another.

Preferably, the first tank is located, in use, above the second tank in order to facilitate the gravity driven flow of fluid from the first tank to the second tank.

Preferably, a run-off is provided adjacent the lower end of at least one of the layers, into which runoff excess biomass can be forcibly washed.

Preferably, the run-off extends substantially across the width of the respective sheet.

According to a second aspect of the present invention, there is provided a method of biologically treating a fluid, the method comprising the step of causing the fluid to flow sequentially over a plurality of substantially horizontal layers of growth medium having a biofilm thereon, the direction of flow of the fluid being caused to reverse from one layer to the next.

Preferably, the method comprises the additional step of temporarily retaining portions of the fluid in discrete reservoirs disposed along the path of flow of the fluid.

Preferably, the method comprises, in the step of causing the fluid to flow sequentially over the plurality of layers, causing the fluid to flow from an entrance end of the respective layer to an exit end of said layer; and causing the fluid to cascade from the exit end of the respective layer onto the entrance end of the next layer.

Preferably, the method comprises, in the step of causing the fluid to flow sequentially over the plurality of layers, causing the fluid to flow across a first set of layers; and subsequently causing the fluid to flow across a second set of layers in which second set the layers are more closely spaced to one another that in the first set.

Preferably, the method comprises the step of causing the fluid to flow from the first set of layers to the second set of layers solely under the influence of gravity.

The present invention will now be described with reference to the accompanying drawings, in which.

Figure 3:
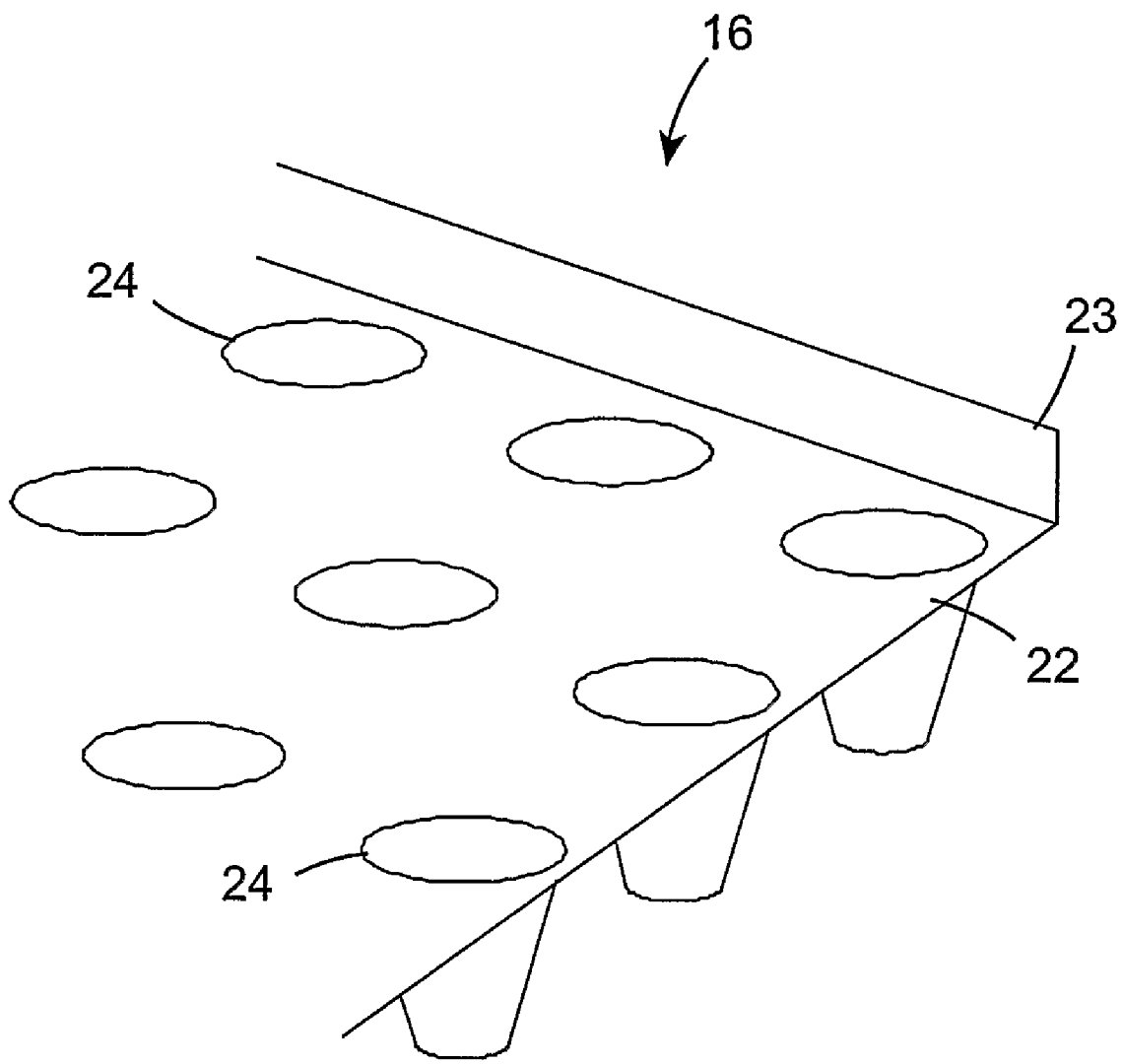
FIG. 3 illustrates a perspective view of a corner of a layer of growth medium forming part of the reactor illustrated in FIGS. 1 and 2.

Referring now to the accompanying drawings, there is illustrated a preferred embodiment of a reactor according to the present invention, generally indicated as 10, which is adapted to provide a simple yet effective means of removing, in particular, carbon and nitrogen contaminants from wastewater. The reactor 10 comprises a first or upper tank 12 and a second or lower tank 14 which therefore define a two-stage treatment process for wastewater, as will be described in detail hereinafter. The tanks 12, 14 each house growth medium for supporting a biofilm (not shown) thereon. The upper tank 12 is provided with a plurality of layers in the form of sheets 16, hereinafter referred to as upper sheets 16, stacked one above the other while the lower tank 14 is provided with a plurality of layers in the form of sheets 18, hereinafter referred to as lower sheets 18 again stacked one above the other. FIG. 3 illustrates a corner of one of the sheets 16, whose configuration and operation will be described in greater detail hereinafter. The sheets 16, 18 together form the growth medium on which, in use, the biofilm grows. The sheets 16, 18 may be of any suitable material, and in the preferred embodiment illustrated are formed from plastic. Wastewater is slowly passed through the reactor 10, thus having prolonged contact with the biofilm, which therefore removes the carbon and nitrogen contaminants from the wastewater, as will be described hereinafter.

Aside from some dimensional differences, the configuration and operation of the upper tank 12 and the lower tank 14 are almost identical, and the following description of the configuration and operation of the upper tank 12 is therefore applicable, unless otherwise stated, to the lower tank 14. Thus the upper tank 12, in the preferred embodiment illustrated, is substantially rectangular in cross section, with a plurality of the upper sheets 16 stacked one on top of the other therein. The plurality of upper sheets 16 are therefore also substantially rectangular in shape. When located within the tank 12, each upper sheet 16 is substantially horizontally disposed, and defines a fluid entrance end 20 via which fluid is introduced onto the respective sheet 16, and a fluid exit end 22 via which fluid leaves the respective sheet 16. The exit end 22 of each sheet 16 is in fluid communication with the entrance end 20 of the sheet 16 directly therebeneath. The plurality of sheets 16 are therefore arranged so that waste water pumped from a primary or septic tank (not shown) on to the uppermost sheet 16 will flow along the sheet 16 from left to right, and cascade or drop on to the second sheet 16, where it will flow from right to left to the exit end 22 of said sheet 16, before falling on to the third sheet 16, and so on down through the upper tank 12. In this way, a reversing or boustrophedonic flowpath is defined within the tank 12, thereby maximising the distance of the flowpath, and therefore the hydraulic residence time, within the reactor 10. This flowpath is indicated by the arrows in the drawings, illustrating the reversing direction of flow for each consecutive sheet 16. In order to ensure that the fluid flows from the entrance end 20 to the exit end 22 on each sheet 16, each sheet 16 is provided with an upstanding perimeter wall 23 along each side of the sheet 16, other than along the side defined by the exit end 22. The perimeter wall 23 ensures that the fluid can not spill over the sides of the sheets 16, thus constraining the fluid to flow from the entrance end 20, along the sheet 16, to the exit end 22. In the preferred embodiment illustrated, the perimeter wall 23 is approximately 25 mm in height on the upper sheets 16, and approximately 10 mm in height on the lower sheets 18.

The reactor 10 embodies a number of features which serve to maximise the hydraulic retention time, while minimising both the height and the footprint, of the reactor 10. The slower the wasterwater travels over each sheet 16, the greater the hydraulic retention time, and therefore the greater the removal rate of contaminants from the wastewater. To this end, the gradient across each sheet 16 is preferably minimised, while still enabling the gravity driven flow of the wastewater across each sheet 16. A related benefit of minimising the gradient on each sheet 16 is that more sheets 16 can be stacked within the tank 12 for a given height thereof. Clearly the greater the number of sheets 16, the greater the hydraulic retention time.

As a further means of maximising the number of sheets 16 for a given height of the tank 12, the spacing between adjacent sheets 16 should be kept to a minimum.

As detailed above, in order to adequately treat contaminated wastewater, it is necessary to remove organic carbon, in addition to effecting nitrification and denitrification. Organic carbon removal is effected by heterotrophic organisms that respire through aerobic or anaerobic pathways, and whose population, under ideal conditions, can double every hour. Nitrifying or autotrophic bacteria, responsible for nitrification, are slower growing that heterotrophic bacteria and under ideal conditions double their population only every 24 hours. Nitrification occurs under aerobic conditions, and is inhibited by organic carbon concentrations of greater than approximately 15-20 mg/L. However, as will become apparent from the examples below, the organic carbon concentration for most wastewaters significantly exceeds the above-mentioned threshold for nitrification to occur. Reduction of the organic carbon concentration to a level below this threshold does not occur until the wastewater has substantially passed through the first tank 12. Thus the biofilm within the first tank 12 is comprised substantially of heterotrophic growth, while the biofilm within the second or lower tank 14 is comprised substantially of autotrophic growth. It is for this reason that the reactor 10 is essentially a two-stage reactor, with the first treatment stage occurring in the upper tank 12, where organic carbon removal is effected, while the second stage is effected in the lower tank 14, in which nitrification/denitrification occurs.

As mentioned above, heterotrophic growth is significantly more vigorous that autotrophic growth, and the spacing between the upper sheets 16 must therefore be sufficient to avoid clogging by heterotrophic growth of the biofilm, while the spacing between the lower sheets 18 need only be sufficient to prevent clogging by autotrophic growth. This consideration limits the number of sheets 16, 18 that can be stacked within the respective tanks 12, 14. It is for this reason that there are a greater number of sheets 18 in the lower tank 14 per unit height of the lower tank 14. In the preferred embodiment illustrated, the spacing necessary between the upper sheets 16, in order to prevent clogging by hedrotrophic growth, is approximately 25 mm, while the spacing between the lower sheets 18 necessary to avoid clogging by autotrophic growth is approximately 10 mm. These distances may however vary depending on the particular configuration of the sheets 16, 18. Increasing the spacing beyond that necessary will reduce the number of sheets 16, 18 locatable with a given height of tank 12, 14, or for the same number of sheets 16, 18, will require a taller tank 12, 14. Thus it is beneficial, but not essential, to keep the spacing between sheets 16, 18 to the minimum required.

In order to further increase the efficacy of the reactor 10, the surface area of the sheets 16, 18 is increased by the provision of a plurality of protrusions 24, which in the preferred embodiment illustrated are in the form of frusto conical depressions 24, thereby providing a larger area for biofilm colonisation, and thus a larger biofilm for treating the wastewater. It will be appreciated that the depressions 24 could be of any suitable shape and size, although the greater the size/surface area of each depression 24, the greater the benefit. Thus the depressions 24 preferably have a depth equal to the requisite spacing between adjacent sheets 16, 18, in order to maximise the surface area of the depressions 24. As a result, the array of depressions 24 in each sheet 16, 18 allow adjacent sheets 16, 18 to be stacked directly on top of one another, with the depressions 24 acting to separate the sheets 16, 18 by the requisite distance to avoid clogging. No separate tank mounted supports are therefore necessary for the sheets 16, 18, thus simplifying the construction of the reactor 10.

It will also be appreciated that the depressions 24 could project upwardly, as opposed to downwardly in the preferred embodiment illustrated, with the same increase in surface area being achieved.

However, in addition to increasing the surface area, the use of the downwardly extending depressions 24 creates a miniature anaerobic reactor within each depression 24, thereby creating a suitable environment for autotrophic denitrification to occur. Without some form of anaerobic processing of the wastewater, ammonium will be converted to nitrate by aerobic processes, but will not be subsequently converted into nitrogen. The depressions 24 therefore have a synergistic effect, increasing the surface area of each sheet 16, 18, while simultaneously providing anaerobic zones for achieving denitrification. The depressions 24 are therefore of greatest benefit in the lower tank 14, where nitrification/denitrification mainly occurs. However, as is known, the removal of organic carbon can be achieved by both aerobic and anaerobic processes. Thus the depressions 24 also serve a dual purpose in the upper tank 12, increasing the surface area of each sheet 16, while also providing anaerobic zones to further effect the removal of organic carbon.

Thus, in use, wastewater is periodically pumped, preferably every hour, through a top 26, onto the upper most sheet 16, of the upper tank 12. The wastewater then slowly trickles down through the upper tank 12, in contact with the biofilm colonising each of the upper sheets 16. Throughout the time spent in the upper tank 12, the wastewater is in contact with, and therefore processed by, the biofilm, which thus removes the organic carbon contained therein. The wastewater, after several hours, reaches a base 28 of the upper tank 12, within which is provided an outlet 30. The upper tank 12 is preferably positioned directly above the lower tank 14, such that the wastewater exiting the outlet 30 enters the lower tank 14 via a top 32 thereof. The wastewater then begins the same slow passage across each of the lower sheets 18, during which time nitrification/denitrification occurs. After several hours draining through the lower tank 14, the wastewater will reach a base 34 thereof, within which is provided an outlet 36 from which the treated wastewater exits. After exiting the reactor 10, the wastewater should be suitable for re-use, and may therefore be released back into the environment. However, for heavily contaminated wastewater, such as industrial waste water, it may be necessary to recycle the effluent leaving the reactor 10, to be returned to the upper tank 12 for one or more additional runs through the reactor 10.

Figure 1:
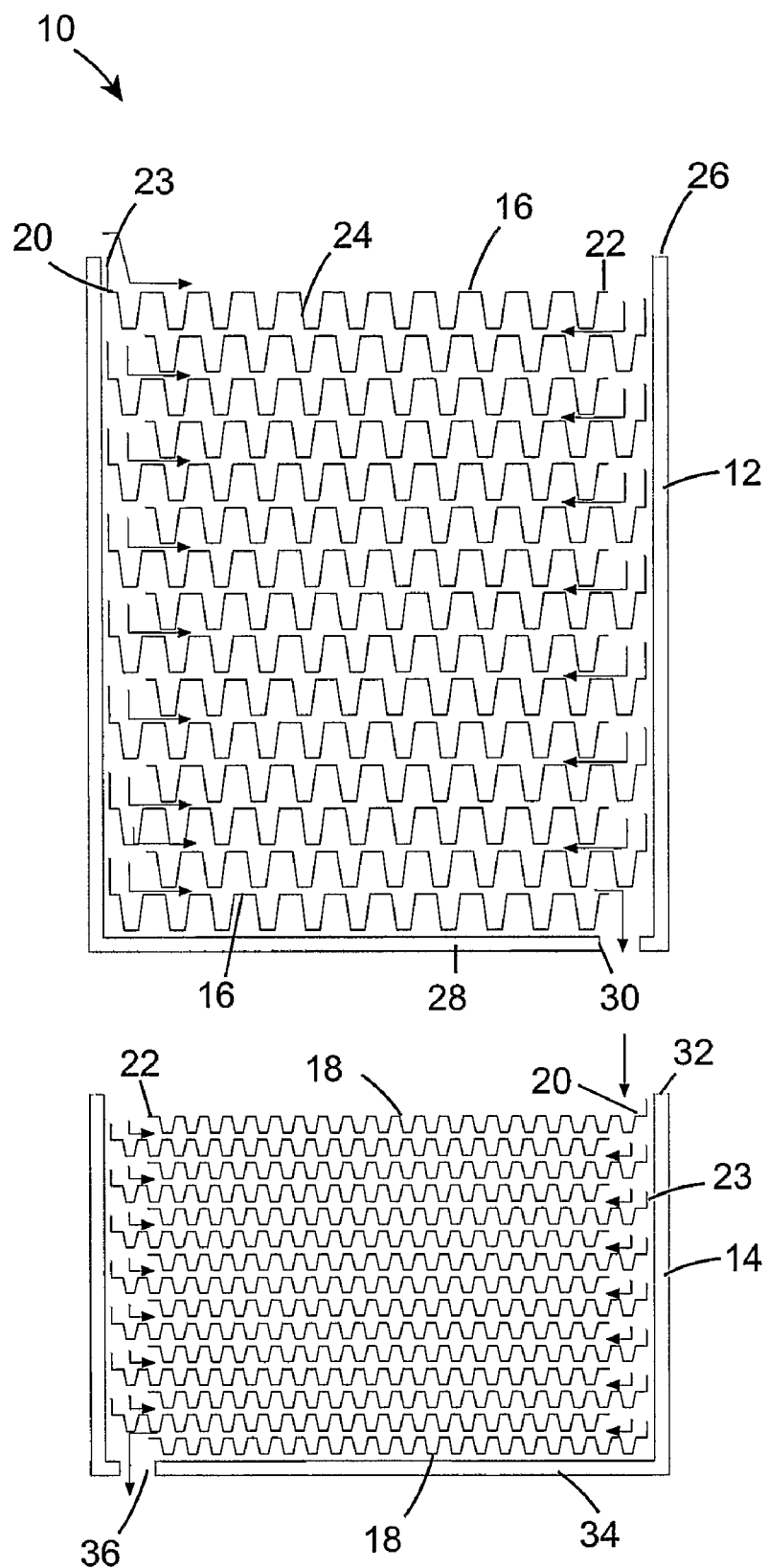
FIG. 1 illustrates a sectioned side elevation of a preferred embodiment of a biofilm reactor according to the present invention.
Figure 2:
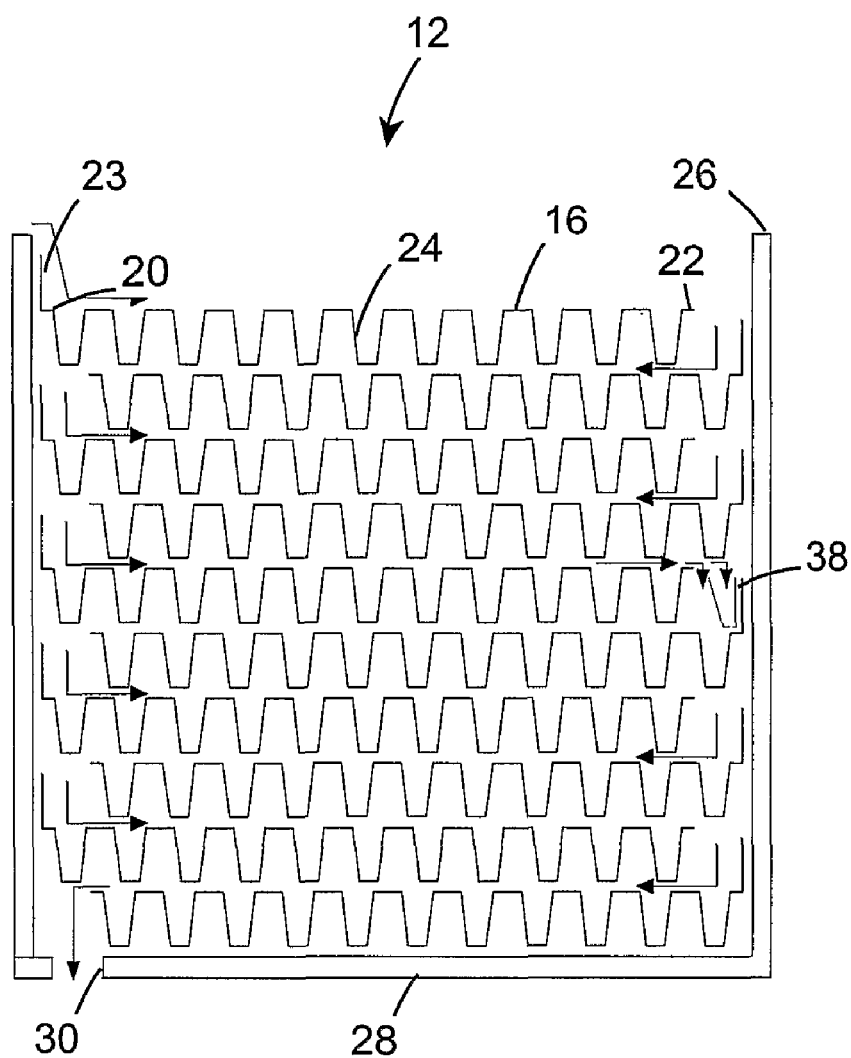
FIG. 2 illustrates a sectioned side elevation of an upper tank of the reactor of FIG. 1.

Periodically, loose biomass (not shown) will be forcibly washed through the reactor 10 and returned to the primary or septic tank (not shown) through a return pipe (not shown), for example by means of a simple solenoid valve (not shown). Referring to FIG. 2, a run-off in the form of a trough 38 may be provided adjacent the lower end 22 of one or more of the sheets 16, 18, positioned at a slight distance downstream thereof. Thus, during normal operation, the slow rate of flow of wastewater across the respective sheet 16, 18 results in the wastewater trickling slowly over the lower end 22, to drop downwardly through the gap between the sheets 16, 18 and the respective trough 38 to continue on through the reactor 10. When it is desired to flush excess biomass from the reactor 10, a pressurised pulse of water can be passed through the reactor 10, the velocity of which will wash the excess biomass across the gap between the respective sheet 16, 18 and the trough 38, thereby depositing the excess biomass within the trough 38. The trough 38 can subsequently be removed from the reactor 10 via a suitably positioned door (not shown) or the like, and emptied, before being re-inserted into the reactor 10.

The following examples illustrate various applications of the reactor 10.

Dairy Washing Wastewater.

The reactor 10 would typically consist of 15 upper sheets 16 at a vertical spacing of 25 mm, above 15 lower sheets 18 at a vertical spacing of 10 mm. These sheets 16, 18 can have depressions 24 with the frustums erect in one typical arrangement and inverted in another typical arrangement.

For a typical dairy herd of 100 cows, the chemical oxygen demand (COD) is 15,000 g COD/day and the hydraulic load is 50 l/cow.day giving 5000 l/herd.day.

For organic carbon removal and nitrification, the organic carbon and hydraulic loading rates on the uppermost sheet 16 would be about 60 g chemical oxygen demand (COD)/$m^2$.d and about 20 l/$m^2$.d, respectively. This arrangement will produce an effluent with zero biodegradable COD that is fully nitrified. At this loading, for a 100-cow herd this requires a plan area of 250 $m^2$ or 25 m×10 m.

For organic carbon removal, nitrification and denitrification, using a step feed, the organic and hydraulic loading rates on the uppermost sheet 16 would be about 45 g chemical oxygen demand (COD)/$m^2$.d and about 15 l/$m^2$.d, respectively. This organic matter will be reduced and nitrification will be complete by the $15^{th}$ sheet 16. On the $15^{th}$ sheet 16, additional wastewater will be added at about 15 g chemical oxygen demand (COD)/m².d and about 5 l/m².d to denitrify the nitrate generated in the top 15 sheets 16. This arrangement will produce an effluent with zero biodegradable COD that is almost completely nitrified, and there will be a reduction in total nitrogen from an influent value of 300 mg/l to 60 mg/l.

In an alternative method for organic carbon removal, nitrification and denitrification that involves recycle, the organic and hydraulic loading rates on the uppermost sheet 16 would be about 20 g chemical oxygen demand (COD)/m².d and about 100 l/m².d, respectively. 80% of the effluent from the horizontal flow unit is mixed with the influent in an anoxic tank, prior to the reactor 10, causing denitrification and some organic carbon removal. The total effluent from the anoxic tank is then applied to the uppermost sheet 16 of the reactor 10. This arrangement will produce an effluent with zero biodegradable COD that is almost completely nitrified, and there will be a reduction in total nitrogen from an influent value of 300 mg/l to 50 mg/l.

Domestic Wastewater.

The reactor 10 would typically consist of 15 upper sheets 16 at a vertical spacing of 25 mm, above 15 lower sheets 18 at a vertical spacing of 10 mm. These sheets 16, 18 can have depressions 24 with the frustums erect in one typical arrangement and inverted in another typical arrangement.

For a typical single house—4 persons, the chemical oxygen demand (COD) is 400 g COD/day and the hydraulic load is 200 l/person.day giving 800 l/house.day.

For organic carbon removal and nitrification, the organic and hydraulic loading rates on the uppermost sheet 16 would be about 50 g chemical oxygen demand (COD)/m².d and a maximum 200 l/m².d, respectively. This arrangement will produce an effluent with zero biodegradable COD that is fully nitrified. At this loading, a 4-person house requires a plan area of 8 m² or e.g. 4 m×2 m. For organic carbon removal alone, only about 6 sheets 16 at 25 mm spacing are required.

For organic carbon removal, nitrification and denitrification, using a step feed, the organic loading rate on the uppermost sheet 16 would be about 45 g chemical oxygen demand (COD)/m².d. This organic matter will be reduced and nitrification will be complete by the 15$^{th}$ sheet 16. On the 15$^{th}$ sheet 16, additional wastewater will be added at about 15 g chemical oxygen demand (COD)/m².d to denitrify the nitrate generated in the top 15 sheets 16. This arrangement will produce an effluent with zero biodegradable COD that is almost completely nitrified, and there will be a reduction in total nitrogen from an influent value of 35 mg/l to 8 mg/l.

In an alternative method for organic carbon removal, nitrification and denitrification that involves recycle, the organic and hydraulic loading rates on the uppermost sheet 16 would be about 20 chemical oxygen demand (COD)/m².d, and approximately 100 l/m².d, respectively. 80% of the effluent from the reactor 10 is mixed with the influent in the primary settling or septic tank (not shown), prior to the reactor 10, causing denitrification and some organic carbon removal. The total effluent from the anoxic tank is then applied to the uppermost sheet 16 of the reactor 10. This arrangement will produce an effluent with zero biodegradable COD that is almost completely nitrified, and there will be a reduction in total nitrogen from an influent value of 35 mg/l to 6 mg/l.

It is therefore apparent that the reactor 10 of the present invention provides a simple yet effective means of treating both domestic and industrial wastewater. The reactor 10 may also be used to effect the biological processing of pharmaceutical products or the like. The reactor 10 has no moving parts, and is therefore extremely robust and maintenance free, while also having a very small footprint due to the extended flowpath defined therein. The reactor 10 is thus inexpensive to construct and operate. It will be appreciated that the upper sheets 16 and the lower sheets 18 could be contained within a single tank (not shown), and the separation into the upper tank 12 and the lower tank 14 is for practical reasons only.

It should also be appreciated that the method and apparatus of the present invention are not limited in use to the treatment of wastewater or the like. The method and apparatus may be utilised in the production of a large number of products by various means, for example fermentation processes or the like, or the production of biogas for use as a fuel, or indeed for producing biomass itself, from which various substances/products may be extracted. For example, the biomass in the apparatus 10 could be used in fermenting certain aqueous solutions to produce ethanol, citric acid, or acetone as primary metabolites, while secondary metabolites such as penicillin may also be produced during such fermentation processes. The biomass itself may be harvested from the apparatus 10, and various cells and metabolites isolated therefrom, for example amino acids, hydrocarbons, polysaacharide, etc.

The invention claimed is:

1. A biofilm reactor comprising a plurality of, in use, substantially horizontal layers of growth medium arranged in a stacked array, each layer having a fluid entrance end and a fluid exit end, the exit end of each layer being in fluid communication with the entrance end of the layer therebeneath, characterised in that each layer of growth medium is provided with a plurality of protrusions in order to increase the surface area available for biofilm colonisation, the protrusions being formed as conical or frusto conical depressions in each layer, each protrusion defining a reservoir in which fluid may reside.

2. A reactor according to claim 1 in which the plurality of layers of growth medium define a boustrophedonic flowpath through the reactor.

3. A reactor according to claim 1 in which each layer is provided with an upstanding wall about a perimeter of the layer, other than along the exit end thereof.

4. A reactor according to claim 1 in which the growth medium is divided into a first set of layers and a second set of layers, the spacing between adjacent layers in the first set being sufficient to prevent clogging by heterotrophic growth, while the spacing between adjacent layers in the second set is sufficient to prevent clogging by autothropic growth.

5. A reactor according to claim 4 in which adjacent layers in the first set are separated by a distance of more than 20 mm.

6. A reactor according to claim 4 in which adjacent layers in the second set are separated by a distance of more than 5 mm.

7. A reactor according to claim 4 in which the layers are stacked one on top of the other, the protrusions being dimensioned to contact and suitably space adjacent layers from one another.

8. A reactor according to claim 4 in which the first set of layers are housed within a first tank, and the second set of layers are housed within a second tank, the first and second tanks being in fluid communication with one another.

9. A reactor according to claim 8 in which the first tank is located, in use, above the second tank in order to facilitate the gravity driven flow of fluid from the first tank to the second tank.

10. A reactor according to claim 1 further comprising a run-off provided adjacent the lower end of at least one of the layers, into which runoff excess biomass can be forcibly washed.

11. A reactor according to claim 10 in which the run-off extends substantially across the width of the respective sheet.

12. A method of biologically treating a fluid, the method comprising the step of causing the fluid to flow sequentially over a plurality of substantially horizontal layers of growth medium having a biofilm thereon, the direction of flow of the fluid being caused to reverse from one layer to the next, and temporarily retaining portions of the fluid in discrete reservoirs disposed along the path of flow of the fluid, the reservoirs being defined by conical or frusto conical depressions in each layer.

13. A method according to claim 12 further comprising, in the step of causing the fluid to flow sequentially over the plurality of layers, causing the fluid to flow from an entrance end of the respective layer to an exit end of said layer; and causing the fluid to cascade from the exit end of the respective layer onto the entrance end of the next layer.

14. A method according to claim 12 further comprising, in the step of causing the fluid to flow sequentially over the plurality of layers, causing the fluid to flow across a first set of layers; and subsequently causing the fluid to flow across a second set of layers in which second set the layers are more closely spaced to one another that in the first set.

15. A method according to claim 14 further comprising the step of causing the fluid to flow from the first set of layers to the second set of layers solely under the influence of gravity.

* * * * *

UNITED STATES PATENT AND TRADEMARK OFFICE
CERTIFICATE OF CORRECTION

| | |
|---|---|
| PATENT NO. | : 7,938,965 B2 |
| APPLICATION NO. | : 11/631897 |
| DATED | : May 10, 2011 |
| INVENTOR(S) | : Michael Rodgers et al. |

Page 1 of 1

It is certified that error appears in the above-identified patent and that said Letters Patent is hereby corrected as shown below:

In the Specifications

<u>Column 7</u>
Line 50, Insert --g-- after "20"

Signed and Sealed this
Fourteenth Day of May, 2013

Teresa Stanek Rea
*Acting Director of the United States Patent and Trademark Office*